(12) United States Patent
Verthein et al.

(10) Patent No.: US 7,720,216 B1
(45) Date of Patent: May 18, 2010

(54) ACOUSTIC PASS THROUGH FOR HANDSETS (75) Inventors: William G. Verthein, Bellevue, WA (US); Stephen G. Lee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 54 days.

(21) Appl. No.: 12/274,733

(22) Filed: Nov. 20, 2008

(51) Int. Cl.
*H04M 1/00* (2006.01)
*H04M 9/00* (2006.01)

(52) U.S. Cl. .............................. 379/420.03; 379/433.01
(58) Field of Classification Search .................. 379/419, 379/420.02–420.04, 428.01, 428.02, 433.01; 455/569.1
See application file for complete search history.

(56) References Cited

U.S. PATENT DOCUMENTS

| | | | |
|---|---|---|---|
| 4,720,858 A | 1/1988 | Pavelka et al. | |
| 5,134,649 A | 7/1992 | Gutzmer | |
| 6,002,949 A | 12/1999 | Hawker et al. | |
| 6,438,240 B1 | 8/2002 | Mcleod | |
| 7,031,455 B2 | 4/2006 | Moquin et al. | |
| 2006/0285680 A1 | 12/2006 | Rodman et al. | |

OTHER PUBLICATIONS

"Panasonic KX-TS105W Corded Speakerphone", Retrieved at <<http://www.amazon.com/Panasonic-KX-TS105W-Corded-Speakerphone-White/dp/B000069LIG>>, Oct. 7, 2008, p. 8.

*Primary Examiner*—Tuan D Nguyen
(74) *Attorney, Agent, or Firm*—Turk IP Law, LLC (57) ABSTRACT

An acoustic pass through is provided in telephone handsets for sounds transmitted from a hands free operation speaker laid out underneath the handset. One or more cutouts in a middle portion of the handset in various shapes such as rectangular, round, elliptical, and similar allows enhanced sound quality when the speakerphone feature is used and flexibility in handset design.

20 Claims, 7 Drawing Sheets

ACOUSTIC PASS THROUGH FOR HANDSETS

BACKGROUND

Despite the rapid development of telecommunication technologies, the basic shape and design of telephone devices has changed little in the last few decades. While additional features such as displays, special function buttons, and comparable additions have been incorporated into the base unit, the handset preserves its original outline, being placed over the base unit along one edge typically.

Hands free operation through speakerphone feature has been a mainstay of home and office telephones for a while. To support hands free speakerphone functionality in a compact telephone footprint, the speakerphone speaker is commonly placed under the body of the handset requiring a middle portion of the handset body to be narrow and curved significantly away from the speaker in the base unit of the telephone. This presents considerable restrictions on the industrial design choices. Handsets with rectangular, angular design languages force a wider base unit and placement of the hands free speaker to the side of the handset. Other variations on traditional handset designs often result in visual conflict with the industrial design language of the rest of the telephone.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing an acoustic pass through in telephone handsets for sounds transmitted from a speaker laid out underneath the handset. A cutout in a middle portion of the handset in various shapes such as rectangular, round, elliptical, and similar allows enhanced sound quality when the speakerphone feature is used and flexibility in handset design. According to some embodiments, multiple cutouts in various shapes may be provided in place of a single larger cutout.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 4 is a side view of a conventional handset over a base unit without an acoustic pass through;

FIG. 5 is a side view of a handset with an acoustic pass through according to one embodiment illustrating the design flexibilities enabled by the presence of the acoustic pass through;

DETAILED DESCRIPTION

As briefly described above, an acoustic pass through in form of a single or multiple cutouts in a middle portion of a handset may be used to provide enhanced acoustic performance for hands free operation of a telephone base unit and enable flexibility in handset and base unit designs. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the embodiments is defined by the appended claims and their equivalents.

While the embodiments will be described in the general context telephone devices including handsets and base unit, the present disclosure is not limited to traditional telephone devices, but any communication device that may include a base unit and a handset positioned over a speaker of the base unit. Examples of devices employing modern communication technologies, where embodiments may be implemented are provided below.

An acoustic pass through in form of a single or multiple cutouts in the handset may be designed manually or with the aid of computerized design programs. Such programs may involve hardware and/or software programs such as program modules. Generally, program modules include routines, programs, components, data structures, and other types of structures that perform particular tasks or implement particular abstract data types. Moreover, such design aids may be practiced with other computer system configurations, including hand-held devices, multiprocessor systems, microprocessor-based or programmable consumer electronics, minicomputers, mainframe computers, and comparable computing devices.

Figure 1:
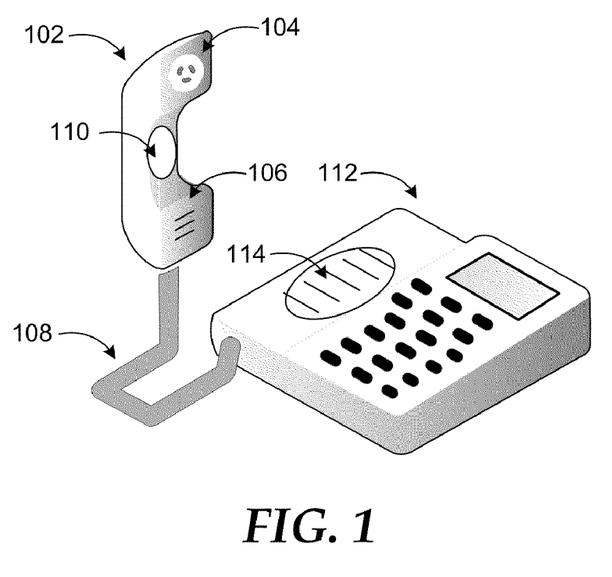
FIG. 1 illustrates a telephone with a base unit and a handset including an acoustic pass through according to one embodiment.

Referring to FIG. 1, a telephone with a base unit and a handset including an acoustic pass through according to one embodiment are illustrated. As discussed above, embodiments may be implemented in communication devices facilitating a variety of advanced communication technologies. Examples of such communication technologies include, but are not limited to, voice telephony, video telephony, instant messaging, data exchange, and similar technologies. Thus, a communication device facilitating those technologies may include specific elements such as a display, special buttons, and the like, depending on the facilitated communication technology(ies).

A basic telephone as shown in the figure includes base unit 112 and handset 102. Handset 102 may be coupled to the base unit 112 through wired or wireless means. Cable 108 is an example of wired connection. Many phones include a speaker 114 as part of a hands free operation. In a majority of phone designs, the speaker 114 is placed along one side of the phone underneath the handset 102, when the handset is cradled on the base unit 112. This presents two main challenges: first, the quality of sound in hands free operation is degraded by the presence of the handset 102 over the speaker 114; second, the design of the handset 102 is restricted to accommodate the acoustic transmission from the speaker 114.

Handset 102 includes a microphone 106 in its lower portion and regular handset speaker 104 in its upper portion. Regular handset speaker 104 is for close-to-ear transmission and its sound levels are significantly lower than those of speaker 114. Handset 102, shown in the figure, has a classical handset shape preferred for speakerphones. A middle portion of the handset is narrower than the lower and upper portions and when placed over the base unit 112, the middle portion is elevated to allow enhanced acoustic transmission from the hands free operation speaker 114.

Despite having a classical shape, handset 102 includes a cutout in its middle portion acting as an acoustic pass through 110 for the hands free operation speaker 114. The acoustic pass through 110 may have a variety of shapes—some examples are illustrated below—such as rectangular, circular, elliptical, and so on. A main purpose of the acoustic pass through 110 is to enable enhanced transmission of sound waves from the hands free operation speaker 114 when the handset is placed over the speaker on the base unit. This also results in increased flexibility in handset design, since the middle portion of the handset 102 does no longer have to be designed narrower than the upper and lower portions or in an elevated manner compared to the upper and lower portions.

Figure 2:
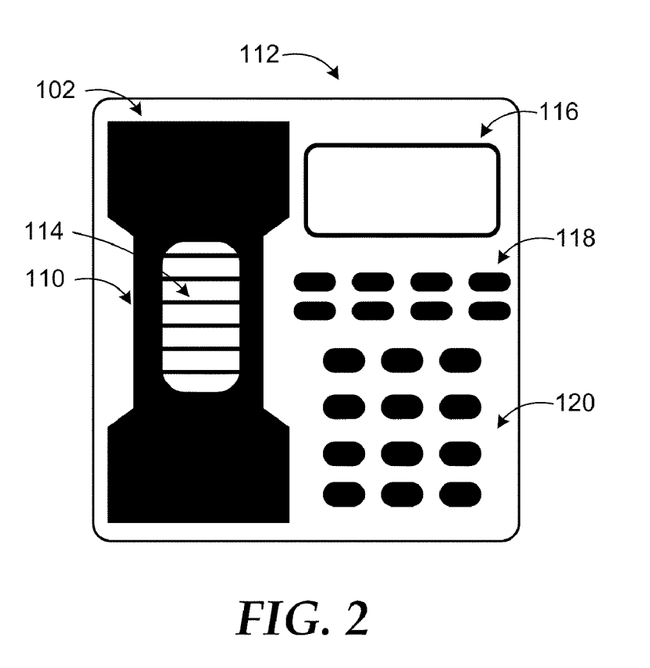
FIG. 2 illustrates a top view of the phone of FIG. 1 with the handset placed over the speakerphone speaker.

FIG. 2 illustrates a top view of the phone of FIG. 1 with the handset placed over the speakerphone speaker. As in many home or office telephones, hands free operation speaker 114 in base unit 112 is placed underneath the handset 102 about a middle portion of the handset. Differently, from conventional telephones, however, handset 102 includes acoustic pass through 110, which allows speaker 114 to transmit sound wave unhampered through the middle portion of the handset.

Base unit 112 of the telephone also includes additional elements such as Dual Tone Multi Frequency (DTMF) dialing buttons 120, special function buttons 118, and display 116. As discussed above, a telecommunication device for implementing embodiments may facilitate other communication methods in addition to voice telephony such as instant messaging, video telephony, etc. The additional elements, such as display 116, may accommodate the other communication methods, as well as complementing voice telephony (e.g. display caller ID numbers, date and time, and similar information).

While specific components and types of telecommunication devices have been described above, these are for illustration purposes only, and do not constitute a limitation on embodiments. Many other hardware environments, components, and device types may be used in implementing an acoustic pass through in a handset according to embodiments using the principles described herein.

Figure 3:
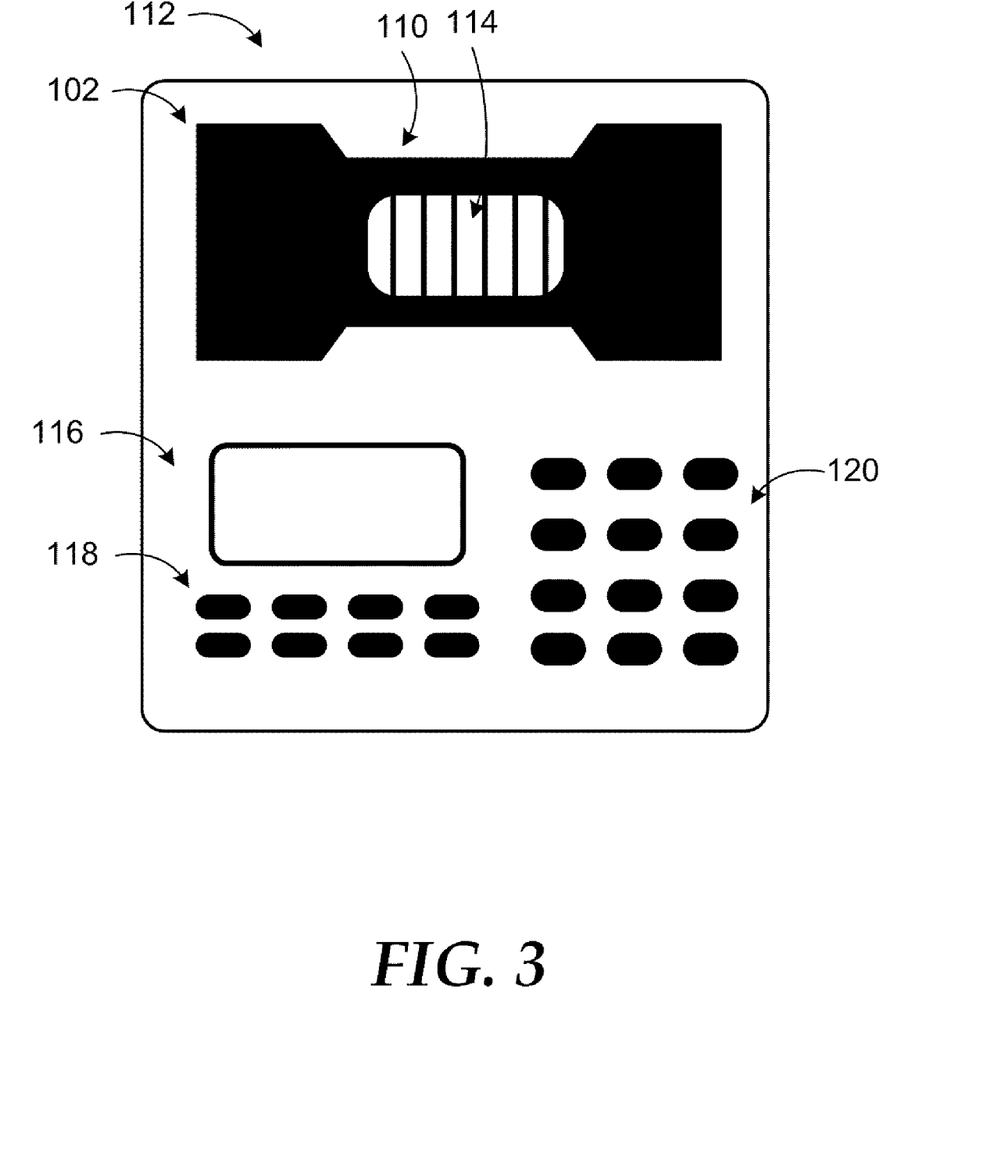
FIG. 3 illustrates a top view of another telephone with a different handset placement including an acoustic pass through according to one embodiment.

FIG. 3 illustrates a top view of another telephone with a different handset placement including an acoustic pass through according to one embodiment. While typical telephone devices have the handset placement along a right or left side of the base unit (as shown in FIG. 1 or 2), a position of the handset 102 or the other elements of the base unit 112 are not limited to those two places.

As shown in FIG. 3, base unit 112 may include display 116, special buttons, 118, and DTMF dialing buttons 120 at a lower portion with the hands free operation speaker 114 being placed on an upper portion of the base unit. Thus, handset 102 may be placed horizontally along the upper side of the base unit 112 with its acoustic pass through 110 over the speaker 114. Of course, many other placements of the handset, hands free operation speaker, and the other elements on the base unit is possible using the principles discussed herein.

Figure 4:
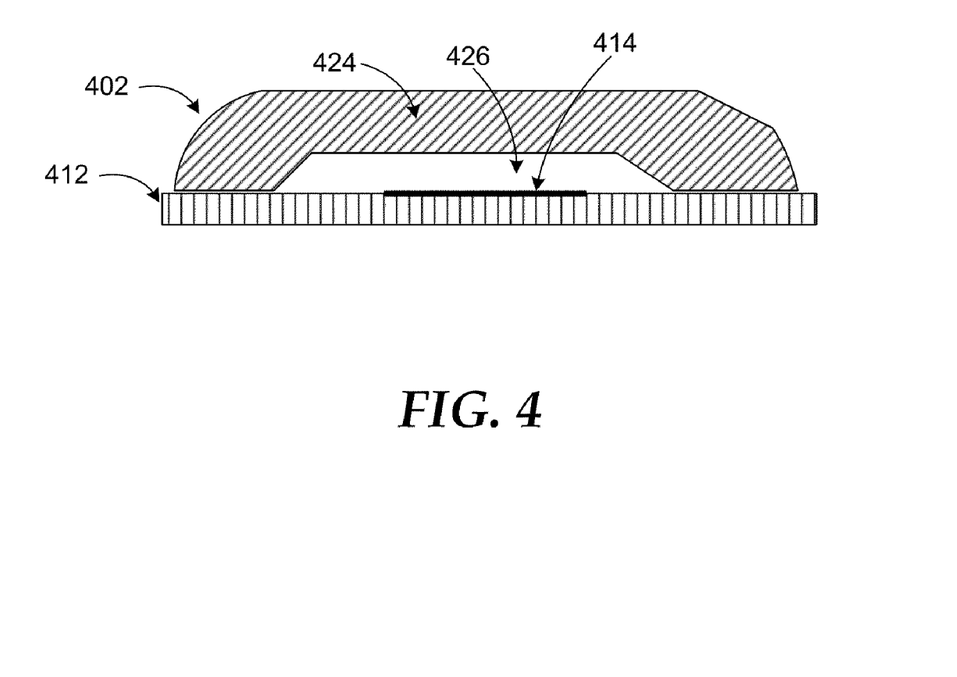

FIG. 4 is a cross-sectional side view of a conventional handset over a base unit without an acoustic pass through. For simplicity purposes, elements such as dialing buttons and bottom parts of the base unit 412 are not shown in FIG. 4. A surface of the hands free operation speaker is indicated by reference numeral 414.

As discussed previously, a minimum amount of space 426 is required over the surface 414 of the hands free operation speaker for audible transmission of sound waves when the phone is in hand free mode. Thus, handset 402 has to be designed with a curvature allowing the middle portion 424 to be elevated in comparison to the lower and upper portions of the handset housing the microphone and speaker of the handset, respectively.

Not shown in the figure is another aspect of conventional handsets to increase the efficiency of the hands free operation speaker. Typically middle portion 424 of the handset 402 is also designed narrower than the upper and lower portions in a plane perpendicular to the cross-sectional plane illustrated in the figure. These restrictions result in additional limitations on handsets and base units. For example, elements such as buttons or small displays associated with advanced communication technologies or even voice telephony itself may not be easily designed onto a back side of a handset because of the shape restrictions.

Moreover, an audio bandwidth utilized by the modern telephone devices may be broader than traditional phones (e.g. wide band audio phones using 0-8 kHz band or narrow band audio phones using 0-4 kHz). Despite the measures discussed above, by virtue of being a physical obstruction in the transmission pathway of the speaker, the body of the handset may degrade the quality of sound from the hands free operation speaker. The degradation may vary depending on the band used, a shape of the handset, and a distance of the handset from the speaker.

Figure 5:
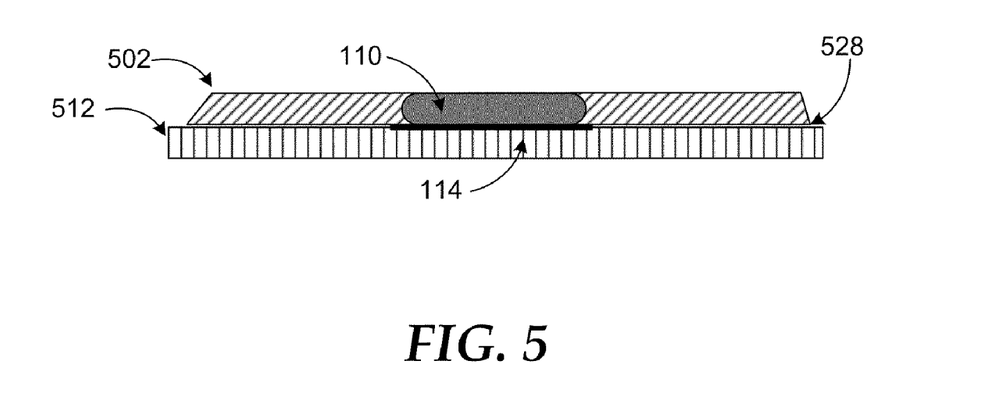

FIG. 5 is a cross-sectional side view of a handset with an acoustic pass through according to one embodiment illustrating the design flexibilities enabled by the presence of the acoustic pass through. Two visible differences between the conventional handset of FIG. 4 and the handset of FIG. 5 are a thickness of the handset and a lack of air space between the handset and the surface of the base unit in the phone of FIG. 5.

Acoustic pass through 110 of handset 502 in FIG. 5 allows sound waves to be transmitted efficiently from hands free operation speaker 114 effectively eliminating the handset's role as an obstacle for the speaker. This in turn eliminates the need to design the middle portion of the handset 502 narrower than the upper and lower portions or with a curvature for air space between the middle portion of the handset 502 and surface of base unit 512. Thus, the surfaces of the handset and the base unit may touch each other when the handset is cradled as shown by reference numeral 528.

The acoustic pass through 110 of handset 502 enables use of any audio bandwidth with increased efficiency regardless of a position of the handset. Furthermore, the elimination of restrictions on the handset shape enable not only lighter and thinner handset designs, but the handset's layout may be designed in such a way that additional elements such as dialing buttons, special function buttons, or even a small display may be placed on the back side of the handset, which may be designed flatter and wider according to some embodiments.

Figure 6:
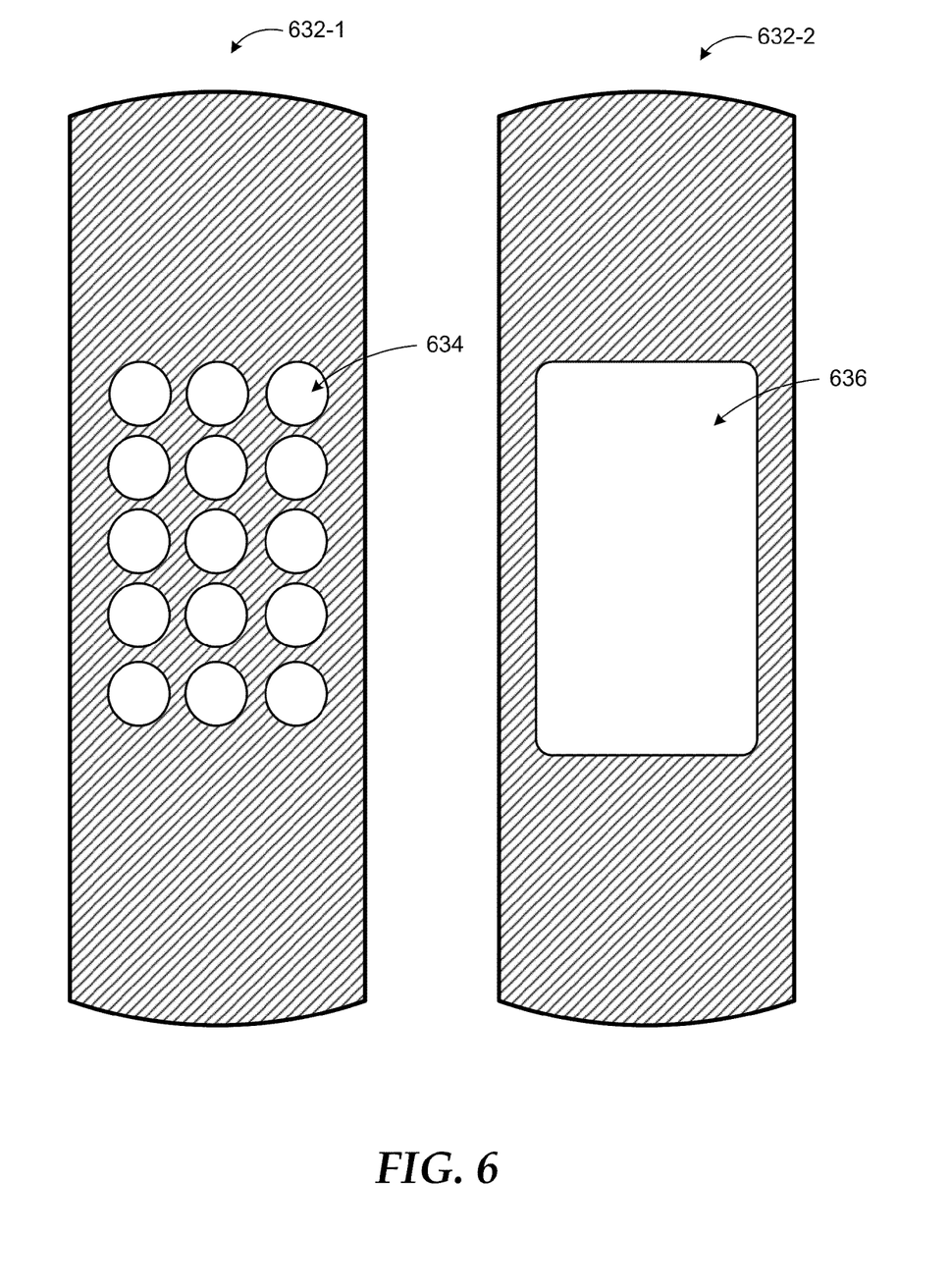
FIG. 6 illustrates two example handset designs according to some embodiments.
Figure 7:
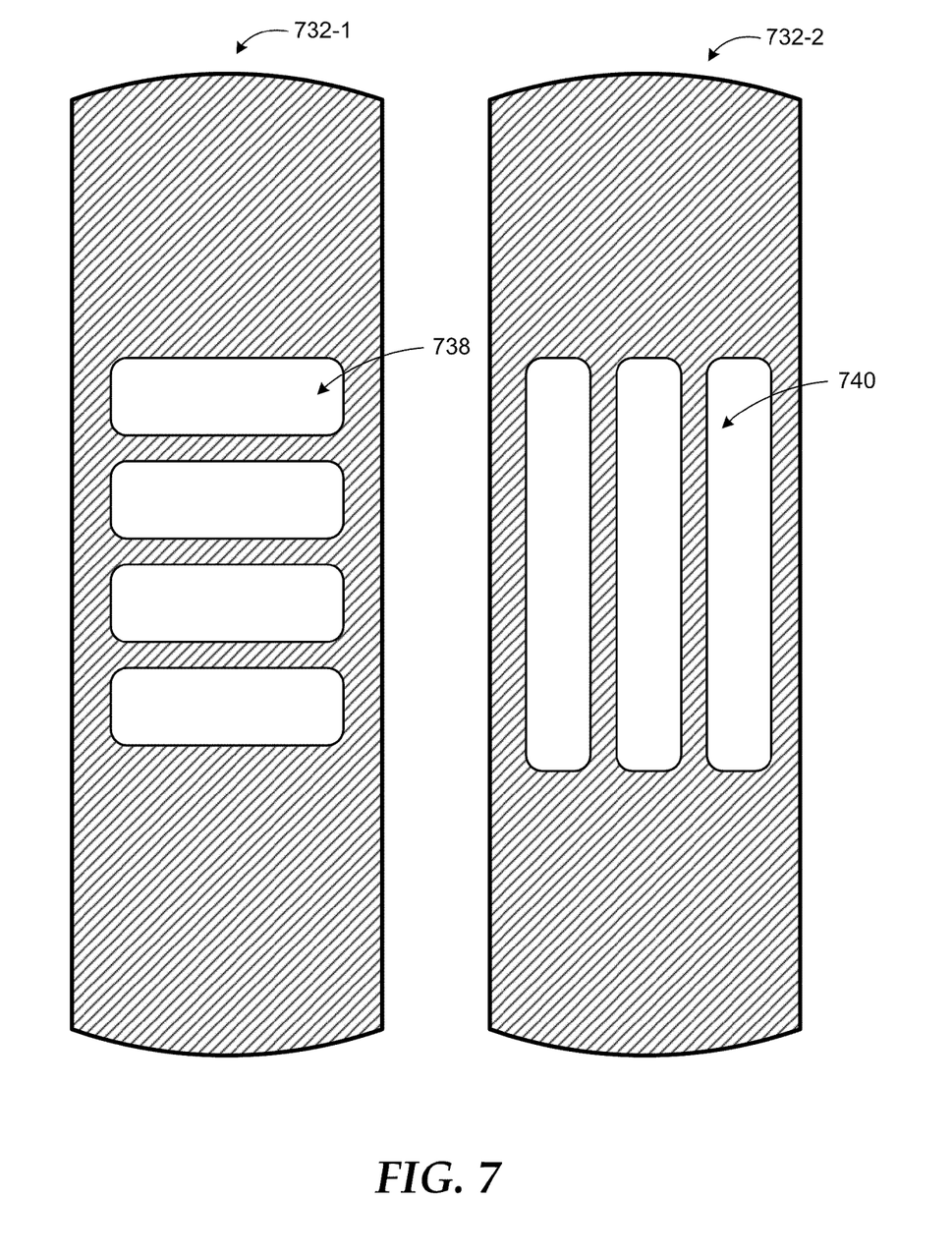
FIG. 7 illustrates two more example handset designs according to other embodiments.

A shape, position, type of the acoustic pass through 110 and a material used to manufacture the housing of the handset 502 may still have an effect on the sound quality of the hands free operation speaker. Thus, the shape, position, type, as well as wall-shape of the cutout in the handset may be designed to provide optimum sound quality for a particular handset type (e.g. overall size and shape of the handset, presence of additional elements on the handset, and other design considerations). FIG. 6 and FIG. 7 illustrate example cutout shapes that may be used to implement embodiments.

FIG. 6 illustrates two example handset designs according to some embodiments. Handset 632-1 includes a plurality of circularly shaped cutouts 634 as acoustic pass through for the hands free operation speaker. A number, shape, and size of the cutouts 634 may be adjusted depending on a size of the handset, a size of the speaker, an audio bandwidth of the speaker, as well as other design considerations. The shape of each individual cutout may be other than circular. Moreover, the cutouts do not have to be uniformly shaped. The shape and size of the cutouts may also vary on the same handset as long as the acoustic pass through is accomplished.

Handset 632-2 of FIG. 6 illustrates a single piece acoustic pass through cutout 636. The cutout is rectangularly shaped with rounded corners. Again, a size, a shape (ratio of longer side to the shorter side), and a rounding radius of the corners may be adjusted to accommodate optimum acoustic pass through and handset design considerations. For example, the cutout may have a circular, elliptical, square, or polygonal shape that is less or more oblong depending on the handset design and hands free operation speaker size/shape.

FIG. 7 illustrates two more example handset designs according to other embodiments. As mentioned above, a plurality of cutouts may be used instead of a single larger cutout for acoustic pass through. Example handset 732-1 includes four rectangularly shaped cutouts 738 with their longer axes along a shorter axis if the handset. Once again, a size and shape of each of the cutouts may be defined differently depending on design considerations. Handset 732-2 includes rectangular cutouts 740 laid out along the longer axis of the handset.

While a size, shape, and type of cutouts have been discussed above, the acoustic pass through cutouts are three dimensional structures. Thus, a shape of their third dimension, their depth, may also influence their acoustic pass through properties. A simple approach may be a straight wall perpendicular to the cutout plane. On the other hand, other shapes and angles may also be utilized to improve acoustic pass through for given cutout shapes as illustrated in FIG. 8 and FIG. 9.

Figure 8:
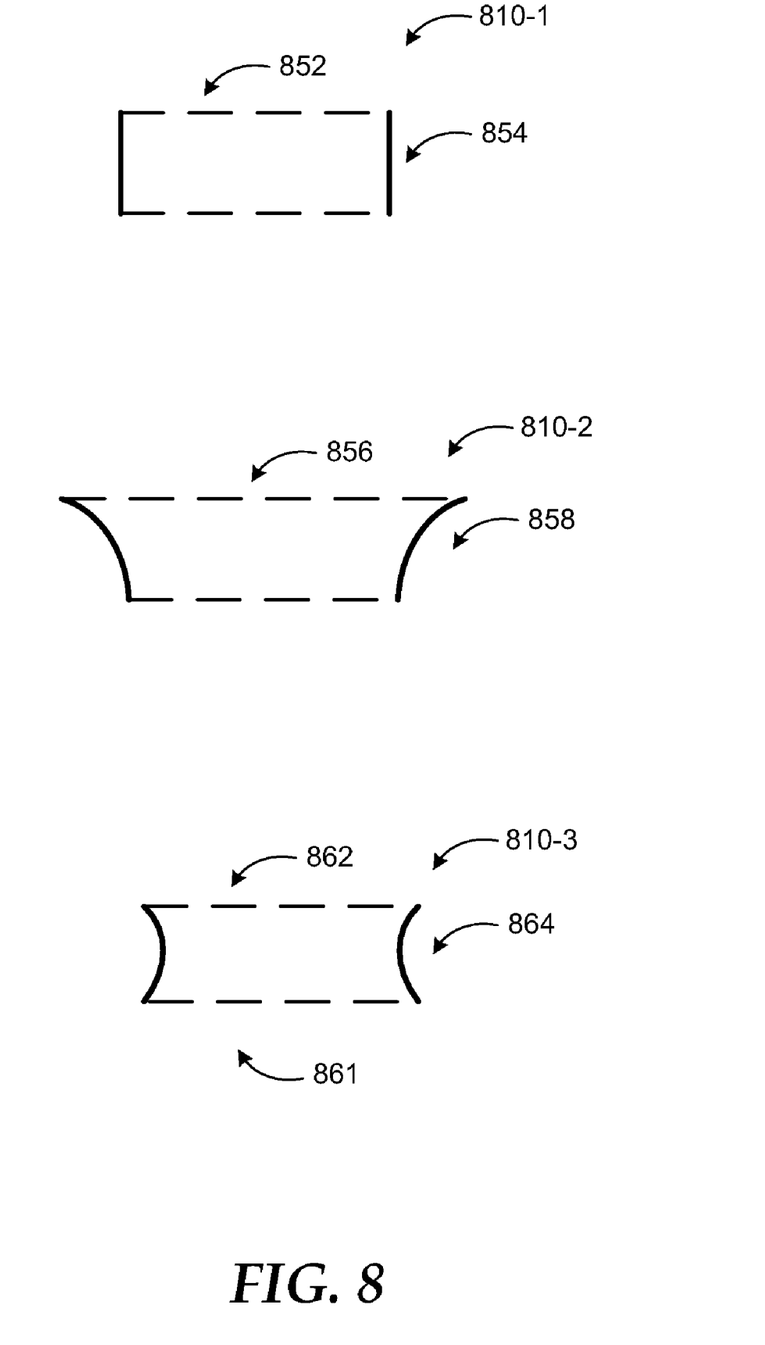
FIG. 8 illustrates side views of various example cutouts according to further embodiments.

FIG. 8 illustrates side views of various example cutouts according to further embodiments. As mentioned above, a basic approach to acoustic pass through cutout design may be a straight inner wall 854 perpendicular to an opening plane 852 of the cutout as shown in example cutout 810-1. This results in a rectangular third dimension cross section.

Another example cutout wall includes curved inner wall 858, which allows a larger opening on the side of the handset away from the hands free operation speaker (856) as shown in cutout 810-2. A further example shape is a fully curved inner wall 864 between the lower and upper opening planes (861, 862) of the cutout as shown in cutout 810-3. The inner walls of the cutouts are not limited to symmetric or same type along all edges of the cutout. Each inner wall of a cutout may have a different shape or angle to the opening plane(s).

Figure 9:
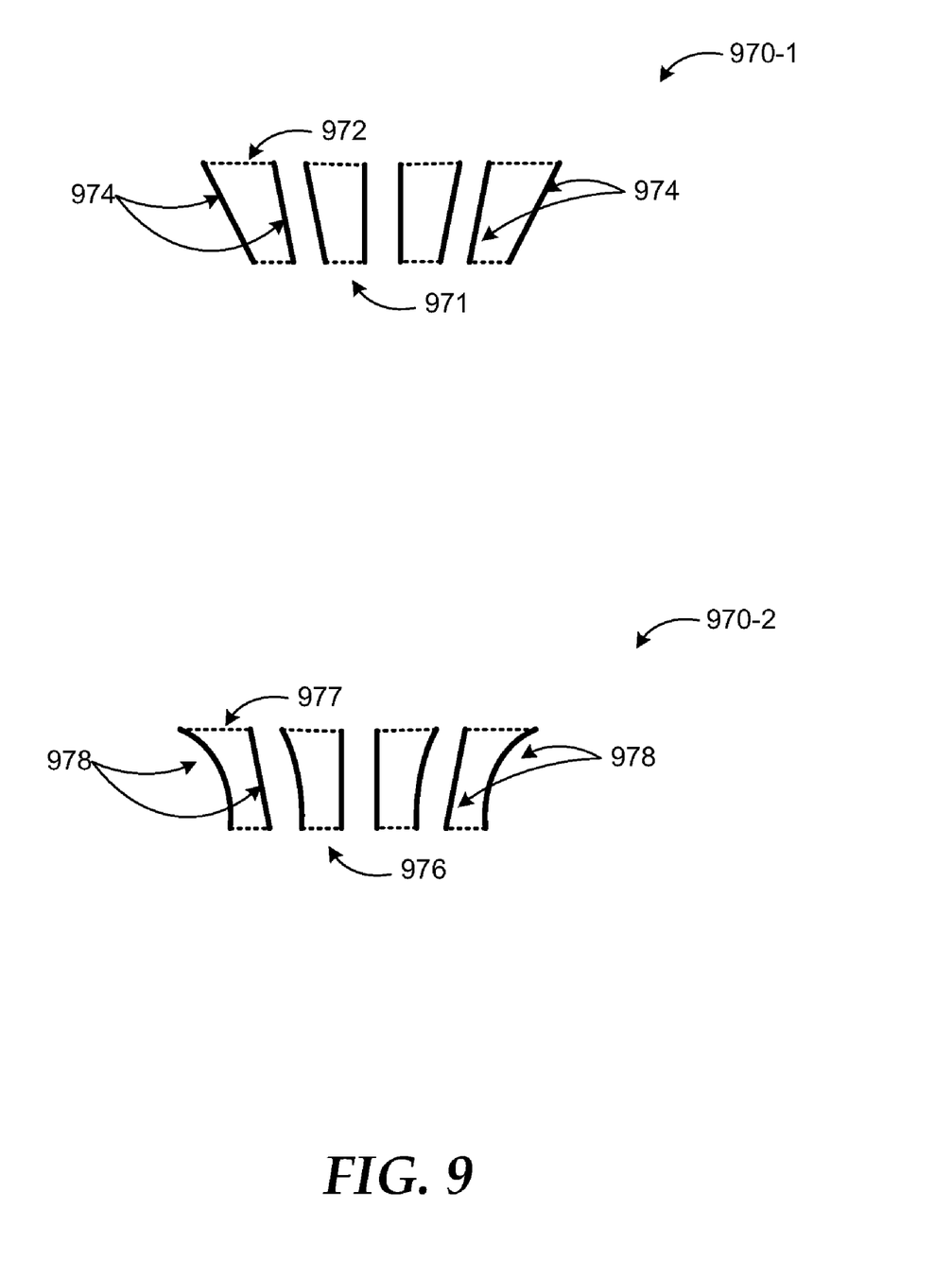
FIG. 9 illustrates side views of two example cutout sets with varying inner wall angles and shapes.

FIG. 9 illustrates side views of two example cutout sets with varying inner wall angles and shapes. As shown in example cutouts 970-1, the cutouts may be designed with inner walls (974) in varying angles to the opening planes (971, 972). This may help prevent a channeling effect on the transmitted sound waves. A similar effect may be achieved using curved inner walls (978) with variable angles to the opening planes (976, 977) as displayed in cutouts 970-2.

It should be noted, that neither the inner wall shapes and angles, nor the opening plane shapes and sizes of the cutouts are limited to the example ones illustrated herein. An acoustic pass through cutout according to embodiments may be implemented in any shape, angle, and type using the principles described above.

Example embodiments may be designed and manufactures through a variety of methods. These methods can be implemented in any number of ways, including the structures described in this document. One such way is by machine operations, combining software programs and hardware of various sorts.

Another optional way is for one or more of the individual operations of the methods to be performed in conjunction with one or more human operators performing some. These human operators need not be collocated with each other, but each can be only with a machine that performs a portion of the program.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A telecommunication device, comprising:
   a base unit for facilitating communication over a network, the base unit having a hands free operation speaker for hands free operation; and
   a handset coupled to the base unit, the handset being configured to be placed over the hands free operation speaker when not in use and having:
   a lower portion housing a microphone,
   an upper portion housing a speaker, and
   a middle portion having a cutout about overlapping with the hands free operation speaker.

2. The telecommunication device of claim 1, wherein the cutout is solid.

3. The telecommunication device of claim 2, wherein the cutout includes one from a set of: a rectangular shape, a circular shape, an elliptical shape, and a polygonal shape.

4. The telecommunication device of claim 2, wherein an inner wall of the cutout includes one from a set of: a straight shape, a convex shape, a concave shape, and a tapered shape.

5. The telecommunication device of claim 2, wherein a parameter of the cutout is determined based on at least one from a set of: a size of the handset, a size of the hands free operation speaker, a shape of the hands free operation speaker, and an audio bandwidth of the telecommunication device.

6. The telecommunication device of claim 5, wherein the parameter of the cutout includes one from a set of: a shape of the cutout, a size of the cutout, a shape of an inner wall of the cutout, and a placement of the cutout on the handset.

7. The telecommunication device of claim 1, wherein the cutout comprises a plurality of apertures.

8. The telecommunication device of claim 7, wherein at least one from a set of: a size, a shape, a placement, and a number of the plurality of apertures is determined based on at least one from a set of: a size of the handset, a size of the hands free operation speaker, a shape of the hands free operation speaker, and an audio bandwidth of the telecommunication device.

9. The telecommunication device of claim 1, wherein the base unit is configured to facilitate at least one from a set of: voice telephony, video telephony, instant messaging, and data exchange.

10. A handset for a networked communication device, comprising:
   a lower portion housing a microphone;
   an upper portion housing a speaker; and
   a middle portion having a cutout that is laid out to overlap with a substantial portion of a hands free operation speaker of a base unit of the networked communication device for facilitating at least one from a set of: voice telephony, video telephony, instant messaging, and data exchange, wherein the cutout comprises at least one aperture.

11. The handset of claim 10, further comprising:
   at least one from a set of: a display, a plurality of DTMF buttons, and a plurality of special function buttons.

12. The handset of claim 10, wherein the at least one aperture has a polygonal shape, and wherein at least one from a set of: a shape, a size, a shape of an inner wall, a number of edges, and a placement of the at least one aperture is determined based on at least one from a set of: a size of the handset, a size of the hands free operation speaker, a shape of the hands free operation speaker, a placement of the hands free operation speaker, and an audio bandwidth of the networked communication device.

13. The handset of claim 12, wherein the cutout includes a plurality of apertures and a number of the apertures is also determined based on at least one from a set of: the size of the handset, the size of the hands free operation speaker, the shape of the hands free operation speaker, the placement of the hands free operation speaker, and the audio bandwidth of the networked communication device.

14. The handset of claim 10, wherein the cutout includes a plurality of apertures that are uniformly shaped.

15. The handset of claim 10, wherein the cutout includes a plurality of slots laid out in parallel to each other, and wherein at least one from a set of: a dimension of each slot, a separation of the plurality of slots, and an angle of each slot relative to a neighboring slot is determined based on at least one from a set of: a size of the handset, a size of the hands free operation speaker, a shape of the hands free operation speaker, a placement of the hands free operation speaker, and an audio bandwidth of the networked communication device.

16. A method for providing enhanced performance in a voice-based communication device with a hands free operation speaker placed underneath a handset of the communication device, the method comprising:
   providing the handset with an acoustic pass through cutout in a middle portion of the handset, wherein a shape, a size, a shape of an inner wall, a corner radius if the shape is a cornered shape, and a placement of the cutout is determined based on at least one from a set of: a size of the handset, a size of the hands free operation speaker, a shape of the hands free operation speaker, a placement of the hands free operation speaker on a base unit, and an audio bandwidth of the voice-based communication device; and
   enabling enhanced transmission of sound waves from the hands free operation speaker through the acoustic pass through cutout when the handset is cradled on the base unit and a hands free operation mode is activated.

17. The method of claim 16, wherein the cutout includes one from a set of: a rectangular shape, a circular shape, an elliptical shape, and a polygonal shape, and wherein the inner wall of the cutout includes one from a set of: a straight shape, a convex shape, a concave shape, and a tapered shape.

18. The method of claim 16, wherein the acoustic pass through cutout includes a plurality of circularly shaped apertures with uniform sizes, separation, and inner wall shapes.

19. The method of claim 16, wherein the acoustic pass through cutout includes a plurality of oblong shaped apertures with uniform sizes, separation, and inner wall shapes.

20. The method of claim 16, wherein a curvature of the handset and a spacing between the base unit and the handset when the handset is cradled on the base unit are minimized.

* * * * *